(12) United States Patent
Oosawa

(10) Patent No.: US 9,109,387 B2
(45) Date of Patent: Aug. 18, 2015

(54) COVER OPENING-AND-CLOSING SUPPORT MECHANISM EMPLOYING GAS SPRING, AND AUTOMATIC TRANSACTION APPARATUS

(75) Inventor: Toshimichi Oosawa, Gunma (JP)

(73) Assignee: Oki Electric Industry Co., Ltd., Tokyo (JP)

(*) Notice: Subject to any disclaimer, the term of this patent is extended or adjusted under 35 U.S.C. 154(b) by 184 days.

(21) Appl. No.: 13/510,002

(22) PCT Filed: Dec. 1, 2010

(86) PCT No.: PCT/JP2010/071498
§ 371 (c)(1),
(2), (4) Date: May 15, 2012

(87) PCT Pub. No.: WO2011/108163
PCT Pub. Date: Sep. 9, 2011

(65) Prior Publication Data
US 2012/0228812 A1    Sep. 13, 2012

(30) Foreign Application Priority Data

Mar. 2, 2010    (JP) .................................. 2010-044927

(51) Int. Cl.
*F16F 9/54*    (2006.01)
*E05F 1/10*    (2006.01)
(Continued)

(52) U.S. Cl.
CPC .............. *E05F 1/1091* (2013.01); *E05C 17/30* (2013.01); *E05G 1/00* (2013.01); *E05G 1/026* (2013.01); *F16F 9/0254* (2013.01); *E05D 11/1007* (2013.01); *E05Y 2800/744* (2013.01)

(58) Field of Classification Search
CPC ................ F16F 5/00; F16F 9/20; F16F 9/49; F16F 9/56; F16F 9/0209; F16F 9/0218; F16F 9/0245; F16F 9/3214; F16F 9/0254
USPC ............................................... 267/124, 64.12
See application file for complete search history.

(56) References Cited

U.S. PATENT DOCUMENTS

| | | | |
|---|---|---|---|
| 4,596,383 A | 6/1986 | Howard | |
| 4,811,983 A * | 3/1989 | Watts et al. | ............. 296/190.05 |

(Continued)

FOREIGN PATENT DOCUMENTS

| | | |
|---|---|---|
| JP | 56-014636 A | 2/1981 |
| JP | 60-192137 A | 9/1985 |

(Continued)

*Primary Examiner* — Anna Momper
*Assistant Examiner* — San Aung
(74) *Attorney, Agent, or Firm* — Rabin & Berdo, P.C.

(57) ABSTRACT

A cover opening-and-closing support mechanism is provided that reliably locks a gas spring, and in which a rod section of a gas spring is not damaged by a stopper portion. The cover opening-and-closing support mechanism includes: a gas spring equipped with pivot points at both end portions and including a cylinder section and a rod section; a stopper portion rotatably provided at the pivot point at a first of the end portions, the stopper portion making contact with the cylinder section when the gas spring has been extended so as to lock the gas spring; a gas spring stopper including a limiter portion that makes contact with the cylinder section before the stopper portion makes contact with the rod section; and a release handle portion for releasing the locking, provided at the gas spring stopper on substantially an opposite side to the stopper portion, such that the gas spring stopper swings towards substantially the opposite side to the stopper portion due to a weight of the release handle portion.

4 Claims, 5 Drawing Sheets

(51) Int. Cl.
  *F16F 9/02* (2006.01)
  *E05C 17/30* (2006.01)
  *E05G 1/00* (2006.01)
  *E05G 1/026* (2006.01)
  *E05D 11/10* (2006.01)

(56) References Cited

U.S. PATENT DOCUMENTS 5,575,513 A * 11/1996 Tuttle ............................ 292/339
5,659,925 A *  8/1997 Patterson ......................... 16/82
5,740,744 A     4/1998 Nashirozawa et al.

2001/0002739 A1 * 6/2001 Okamoto .................... 267/64.12
2008/0120923 A1 * 5/2008 Coe ................................. 52/49
2009/0044998 A1 * 2/2009 Schmidt ..................... 180/69.21

FOREIGN PATENT DOCUMENTS

| JP | U4-109239 | 9/1992 |
| JP | 8-153265 A | 6/1996 |
| JP | 10-115340 A | 5/1998 |
| JP | 11-201210 A | 7/1999 |
| JP | 2000-303736 | 10/2000 |

* cited by examiner

COVER OPENING-AND-CLOSING SUPPORT MECHANISM EMPLOYING GAS SPRING, AND AUTOMATIC TRANSACTION APPARATUS

TECHNICAL FIELD

The present invention relates to a cover opening-and-closing support mechanism employing a gas spring in an automatic transaction machine such as an automated teller machine.

BACKGROUND ART

In an automatic transaction machine such as an automated teller machine, generally configuration is made, as shown in FIG. 5A and FIG. 5B, such that a rear door 102 is unlocked and opened, and an opening-and-closing cover 101 provided for example to an operation panel is opened by removing screws from the rear so as to enable maintenance such as of internal units.

A cover opening-and-closing support mechanism is provided at an automatic transaction machine such as an automated teller machine in order to facilitate opening of the heavy opening-and-closing cover 101 when performing maintenance. A gas spring 91 shown in FIG. 5B assists raising of the opening-and-closing cover 101. A gas spring stopper 92, described later, also locks the gas spring 91 such that the opening-and-closing cover 101 cannot be closed.

In order to close the opening-and-closing cover 101 after maintenance has been completed the cover opening-and-closing support mechanism is configured so as to close slowly when the gas spring stopper 92 is pressed and released.

A cover opening-and-closing support mechanism of such a related automatic transaction device 100 is configured, as shown in FIG. 4, with a gas spring 91 and a gas spring stopper 92.

The gas spring 91 is configured with a cylinder section 91c and a rod section 91d. A gas spring pivot point 91a is provided to the gas spring 91 at the top end of the cylinder section 91c, this being on the side of the opening-and-closing cover 101. A gas spring pivot point 91b is provided at the bottom end of the rod section 91d, this being on the side which is fixed to the cabinet of the automatic transaction device 100.

The gas spring stopper 92 is configured from a stopper portion 92a, a limiter portion 92b, and a spring 93. The stopper portion 92a locks the gas spring 91. The limiter portion 92b is provided so that the stopper portion 92a does not contact the rod section 91d of the gas spring 91 and damage the rod section 91d. The spring 93 is a biasing member for biasing the gas spring stopper 92 towards the gas spring 91 as indicated by arrow A, so as to cause the stopper portion 92a to contact the gas spring 91 as shown in the intermittent lined Region a.

Such a gas spring is attached to the opening-and-closing cover in order for example to push against the weight of the opening-and-closing cover during opening and closing. However, the reaction force from the gas pressure decreases as the gas spring 91 ages. The gas spring stopper 92 is therefore provided to prevent the opening-and-closing cover 101 from sagging. A stopper profile is provided at the gas spring stopper 92 that utilizes the difference between the external profiles of the cylinder section 91c and the rod section 91d of the gas spring 91.

Examples of biasing members include a tension coil spring, as shown in FIG. 4, a compression coil spring that similarly presses the gas spring stopper 92 in the arrow A direction, and torsion springs that are for example attached to the gas spring pivot point 91a and bias in the arrow A direction (see for example Japanese Patent Application Laid-Open (JP-A) No. 10-115340).

DISCLOSURE OF INVENTION

Technical Problem

In a related cover opening-and-closing support mechanism as described above, the spring needs to be provided to ensure that the cylinder section of the gas spring makes contact with the stopper portion of the gas spring stopper when the gas spring has extended, so as to bias the gas spring stopper towards the rod section side of the gas spring. However, sometimes when the force of the spring is too strong, the stopper portion makes contact with the rod section of the gas spring and causes damage to the rod section.

Solution to Problem

A first aspect of the present invention is a cover opening-and-closing support mechanism including: a gas spring equipped with pivot points at both end portions and including a cylinder section and a rod section; a stopper portion rotatably provided to the pivot point at a first of the end portions, the stopper portion making contact with the cylinder section when the gas spring has been extended so as to lock the gas spring; a gas spring stopper including a limiter portion that makes contact with the cylinder section before the stopper portion makes contact with the rod section; and a release handle portion for releasing the locking, provided at the gas spring stopper on substantially an opposite side to the stopper portion, such that the gas spring stopper swings towards substantially the opposite side to the stopper portion due to a weight of the release handle portion.

Advantageous Effects of Invention

According to the cover opening-and-closing support mechanism of the first aspect of the present invention, a gas spring can be reliably locked without provision of a member such as a spring, and a stopper portion also does not make contact with a rod section of the gas spring and damage the rod section.

BEST MODE FOR CARRYING OUT THE INVENTION

Figure 1:
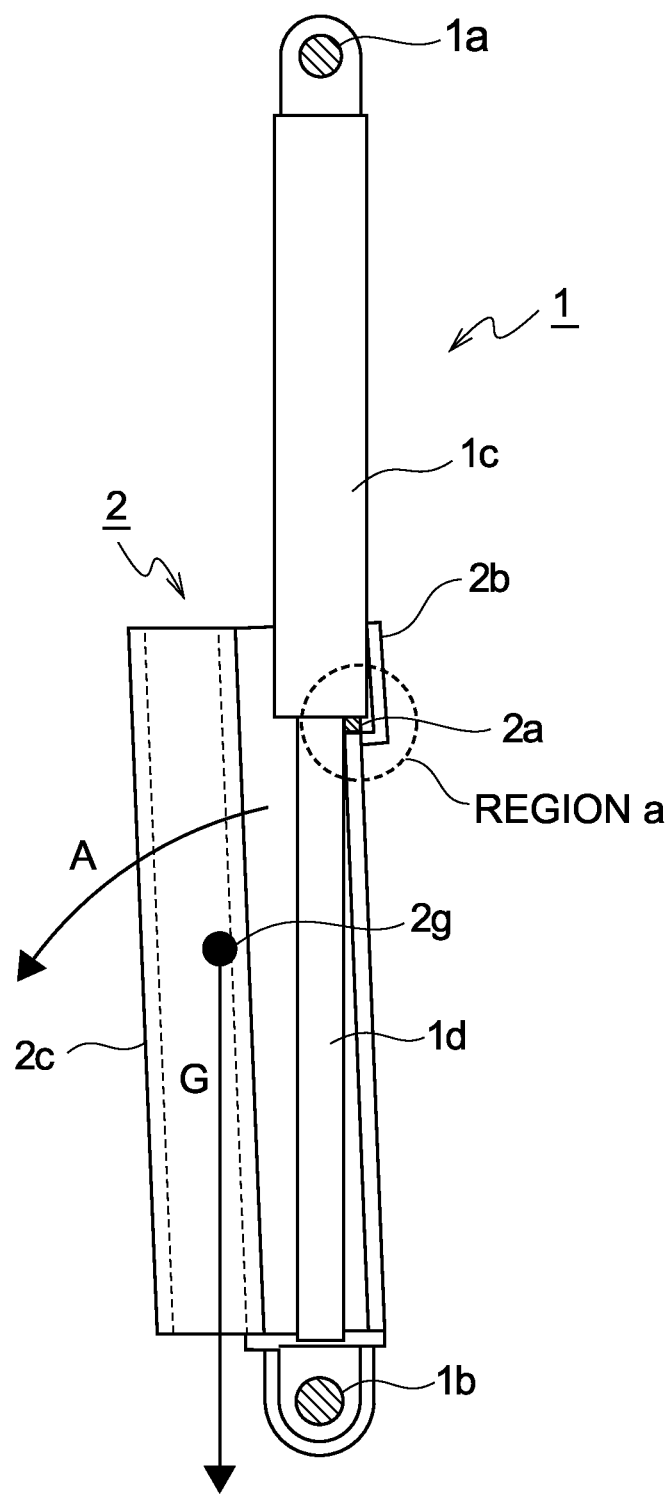
FIG. 1 is a configuration diagram of a cover opening-and-closing support mechanism of a first exemplary embodiment.

Explanation follows regarding an exemplary embodiment according to the present exemplary embodiment, with reference to the drawings. The same reference numeral is used for similar elements in the drawings.

First Exemplary Embodiment

Figure 2A:
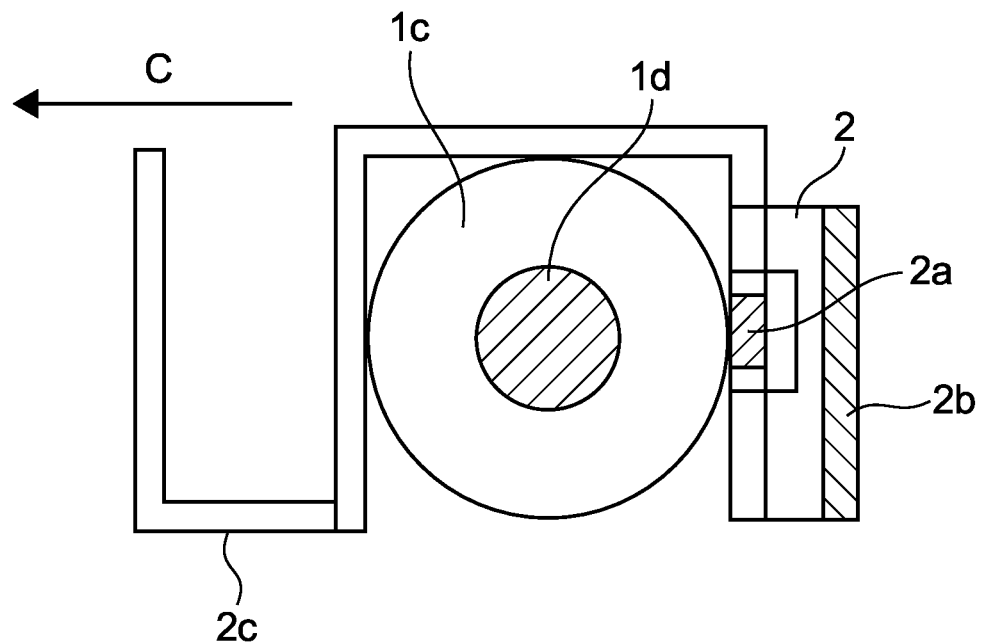
FIG. 2A is a configuration diagram of a cover opening-and-closing support mechanism of the first exemplary embodiment.
Figure 2B:
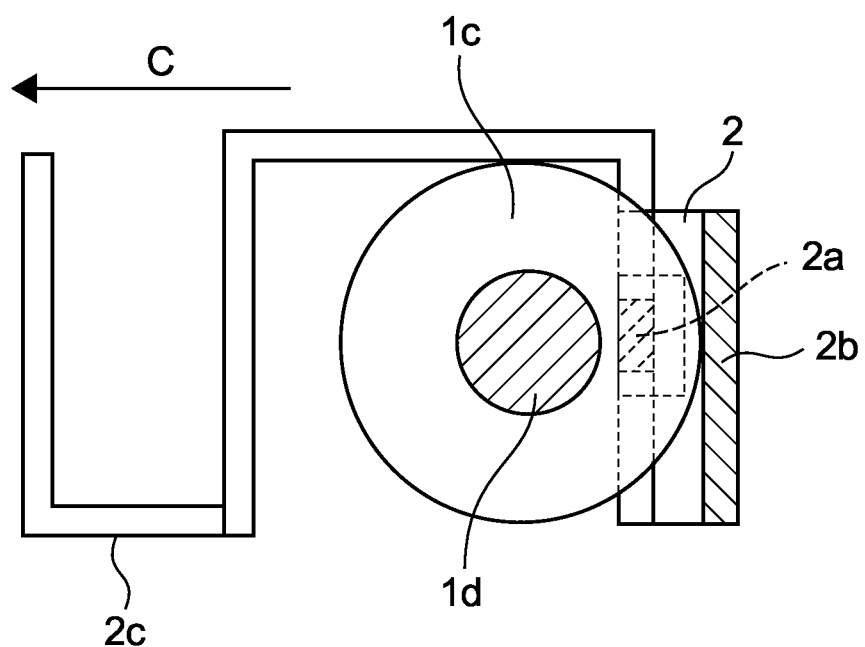
FIG. 2B is a configuration diagram of a cover opening-and-closing support mechanism of the first exemplary embodiment.

FIG. 1 is a side view showing a configuration of a cover opening-and-closing support mechanism of a first exemplary embodiment, and FIG. 2A and FIG. 2B are plan views thereof. As shown in FIG. 1, a cover opening-and-closing support mechanism of the first exemplary embodiment is configured including a gas spring 1 and a gas spring stopper 2.

The gas spring 1 is configured with a cylinder section 1c and a rod section 1d. The gas spring 1 is also equipped with a gas spring pivot point 1a at the top end of a cylinder section 1c, this being disposed on the side of an opening-and-closing cover 101, and a gas spring pivot point 1b at the bottom end of a rod section 1d, this being disposed on the side fixed to a cabinet of an automatic transaction device 100.

The gas spring stopper 2 includes a stopper portion 2a, a limiter portion 2b and a release handle portion 2c. The stopper portion 2a locks the gas spring 1. The limiter portion 2b is provided so that the stopper portion 2a does not contact the rod section 1d of the gas spring 1 and damage the rod section 1d. The release handle portion 2c is provided for releasing the stopper.

In the cover opening-and-closing support mechanism of the first exemplary embodiment, due to provision of the release handle portion 2c, as shown in FIG. 1, the position of the center of gravity of the gas spring stopper 2 is the position 2g on the release handle portion 2c side. A moment is generated as a result that acts in the arrow A direction, due to the weight of the release handle portion 2c itself.

The positional relationship between the stopper portion 2a and the limiter portion 2b is such that, in the opened state of the opening-and-closing cover shown in FIG. 2B, a positional relationship is achieved in which the limiter portion 2b makes contact with the cylinder section 1c of the gas spring 1 prior to the stopper portion 2a contacting the rod section 1d.

Figure 5A:
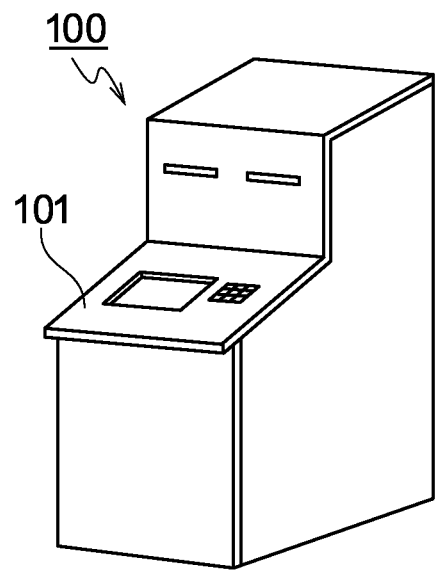
FIG. 5A is an external perspective view of an automatic transaction machine provided with a cover opening-and-closing support mechanism.

The thus configured cover opening-and-closing support mechanism of the first exemplary embodiment is operated in the following manner. Detailed explanation of operation follows with reference to the configuration diagrams of the cover opening-and-closing support mechanism of FIG. 1, FIG. 2A and FIG. 2B, and to an external perspective view and operational explanatory diagram of the automatic transaction apparatus of FIG. 5A and FIG. 5B.

Figure 5B:
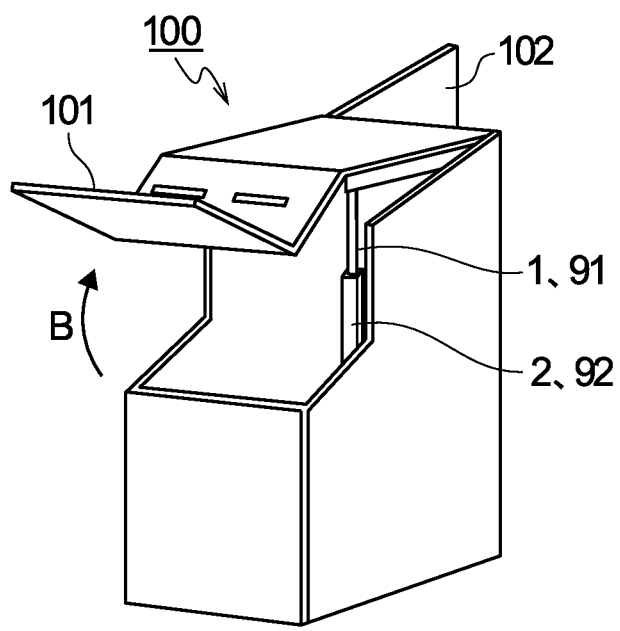
FIG. 5B is an explanatory diagram of the operation of an automatic transaction machine provided with a cover opening-and-closing support mechanism.

When performing, for example, an inspection of an internal unit of the automatic transaction device 100, the lock of the rear door 102 is unlocked and screw fasteners are removed from the rear. Then when the opening-and-closing cover 101 provided at the operation panel is opened, as shown in FIG. 5B, the gas spring 1 is gradually extended. When this is performed the stopper portion 2a for stopping the gas spring 1 from descending is in a state parallel to the gas spring 1, as shown in FIG. 2A.

The extended position of the gas spring 1, namely the position in which the stopper portion 2a for stopping the gas spring 1 has come out from the cylinder section 1c of the gas spring 1, the gas spring stopper 2 is biased towards the rod section 1d of the gas spring 1 in the arrow C direction, as shown in FIG. 2A and FIG. 2B, due to the moment referred to above acting in the arrow A direction generated by the weight of the release handle portion 2c. As a result compression of the gas spring 1 is stopped by the stopper portion 2a, as shown in the intermittent lined Region a in FIG. 1, and a locked state is achieved.

Note that since the cover opening-and-closing support mechanism of the first exemplary embodiment does not swing the gas spring stopper 2 strongly using a biasing member as in related examples, the limiter portion 2b makes contact with the cylinder section 1c of the gas spring 1, and the stopper portion 2a does not contact the rod section 1d of the gas spring 1, as shown in FIG. 2B.

Due to achieving this locked state, the opening-and-closing cover 101 does not sag from the open position under its own weight or close unintentionally.

In order to close the opening-and-closing cover 101 when maintenance, such as of the internal units, has been completed, the release handle portion 2c is pushed in the opposite direction to the arrow A direction, contact between the stopper portion 2a and the cylinder section 1c of the gas spring 1 is ended and the locked state is released. The opening-and-closing cover 101 is accordingly closed and then screwed back on from the rear. The key of the rear door 102 is then locked, thereby completing the maintenance operation.

According to the cover opening-and-closing support mechanism of the automatic transaction machine of the first exemplary embodiment, the release handle portion is provided on substantially the opposite side to that of the stopper portion of the gas spring stopper, shifting the center of gravity of the gas spring stopper away from the axial center of the gas spring, such that the gas spring stopper swings towards substantially the opposite side to that of the stopper portion under its own weight. Consequently, in the cover opening-and-closing support mechanism of the automatic transaction machine of the first exemplary embodiment, the gas spring stopper can be reliably locked without provision of a biasing member such as a spring, and the stopper portion does not contact the rod section of the gas spring and damage the rod section.

Second Exemplary Embodiment

Figure 3A:
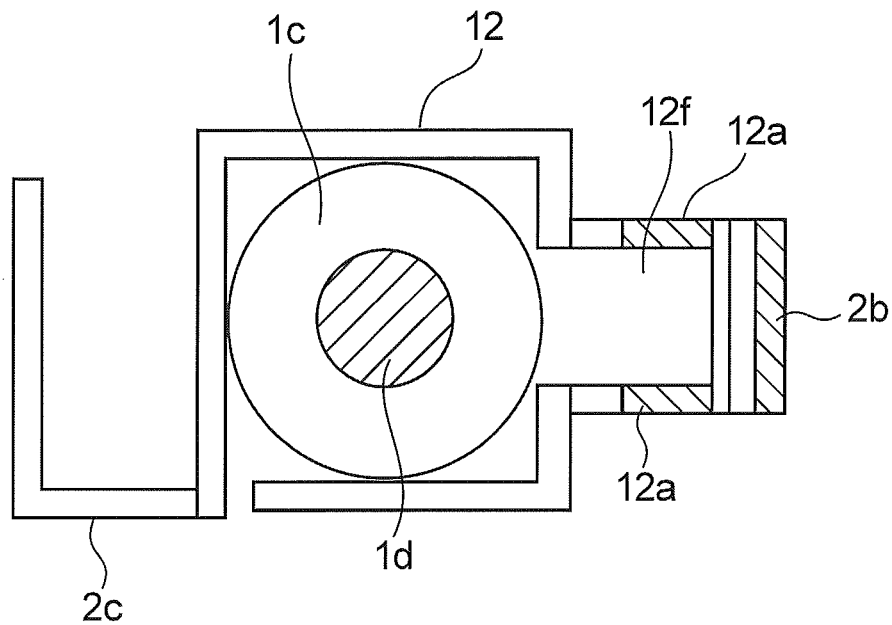
FIG. 3A is a configuration diagram of a cover opening-and-closing support mechanism of a second exemplary embodiment.
Figure 3B:
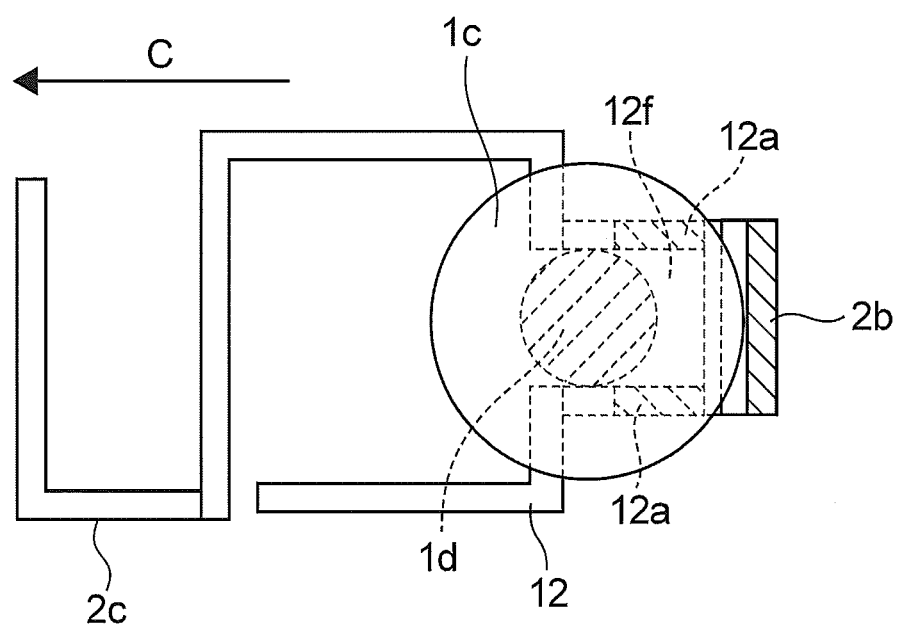
FIG. 3B is a configuration diagram of a cover opening-and-closing support mechanism of the second exemplary embodiment.
Figure 4:
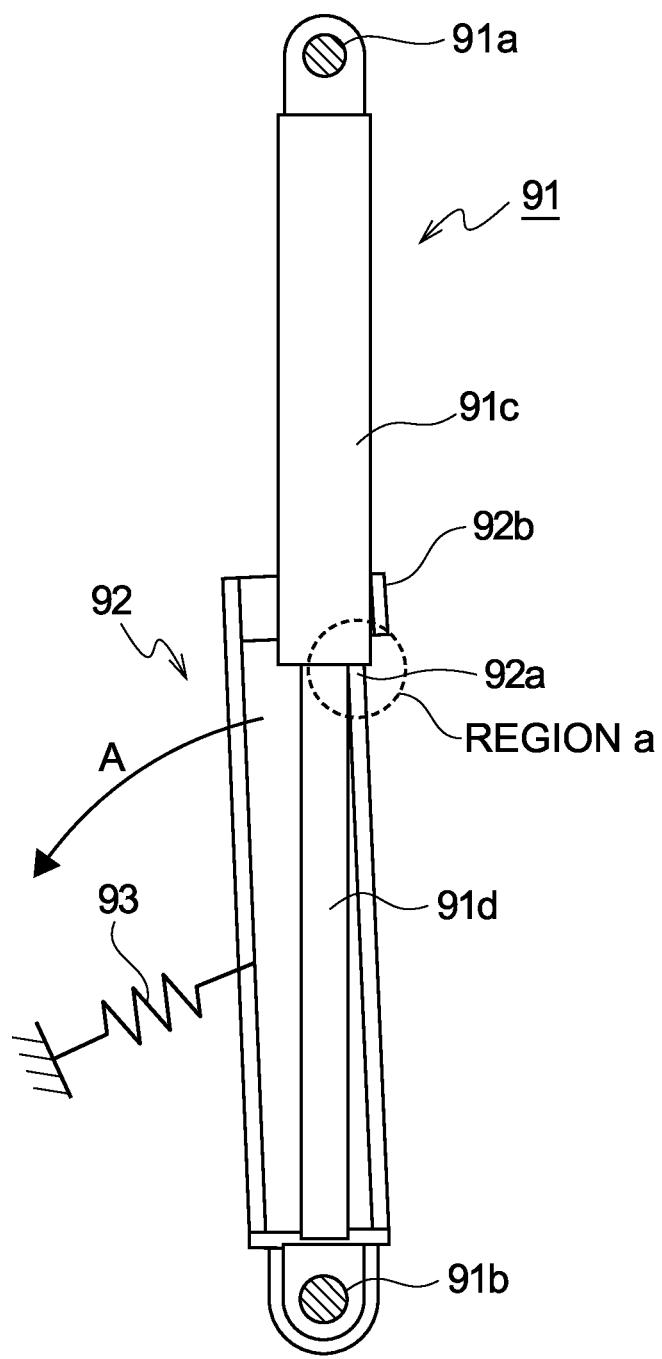
FIG. 4 is a configuration diagram of a related cover opening-and-closing support mechanism.

FIG. 3A and FIG. 3B show top face portions of a cover opening-and-closing support mechanism of a second exemplary embodiment. In the cover opening-and-closing support mechanism of the second exemplary embodiment, as shown in FIG. 3A and FIG. 3B, a space 12f is provided for insertion of a rod section 1d of a gas spring 1. Stopper portions 12a are also provided at two facing locations on either side of the insertion space 12f. Since other parts of the configuration are similar to those of the first exemplary embodiment, further explanation thereof is omitted for simplicity. Note that the side view of the cover opening-and-closing support mechanism of the second exemplary embodiment is substantially the same as FIG. 1.

The cover opening-and-closing support mechanism of the second exemplary embodiment configured as described above operates as follows. Detailed explanation of the operation follows using the cover opening-and-closing support mechanism shown in FIG. 3A and FIG. 3B.

In order to perform an inspection, such as of an internal unit of the automatic transaction device 100, the rear door 102 is unlocked similarly to as in the first exemplary embodiment. Screw fastenings are then removed from the rear, and the gas spring 1 is gradually extended when the opening-and-closing cover 101 provided at the operation panel is opened, as shown in FIG. 5B. When this is being performed the stopper portions 12a for stopping the gas spring 1 from descending are in a state parallel to the gas spring 1, as shown in FIG. 3A.

Then in the extended position of the gas spring 1, namely at a position when the stopper portions 12a for stopping the gas spring 1 have moved away from the cylinder section 1c of the gas spring 1, the gas spring 1 swings about a pivot point of the gas spring pivot point 1b, due to the moment referred to above acting in the arrow A direction of FIG. 1, generated by the weight of the release handle portion 2c.

When this occurs the gas spring stopper 2 is biased towards the rod section 1d of the gas spring 1 in the arrow C direction as shown in FIG. 3A and FIG. 3B, and the rod section 1d passes through the insertion space 12f. As a result compression of the gas spring 1 is stopped in the cover opening-and-closing support mechanism by the stopper portions 12a, as shown in FIG. 3B, and a locked state is achieved.

When this occurs, in the cover opening-and-closing support mechanism of the second exemplary embodiment, the gas spring stopper 2 is not swung strongly with a biasing member as in related examples. The stopper portions 12a are also wider due to the provision of the insertion space 12f, and the accuracy required in the positional relationship between the limiter portion 2b and the stopper portions 12a is lowered. Consequently, in the cover opening-and-closing support mechanism of the second exemplary embodiment, a configuration can be achieved in which the stopper portions 12a do not contact the rod section 1d of the gas spring 1 since the limiter portion 2b always makes contact first with the cylinder section 1c of the gas spring 1.

Due to achieving this locked state, the opening-and-closing cover 101 does not sag from the open position under its own weight, and does not close unintentionally.

In order to close the opening-and-closing cover 101 when maintenance, such as of an internal unit, has been completed, the release handle portion 2c is pushed in the opposite direction to the arrow A direction, and contact of the cylinder section 1c of the gas spring 1 with the stopper portions 12a is ended. The opening-and-closing cover 101 accordingly closes due to releasing the locked state. Screw fasteners are screwed back on from the rear, the key of the rear door 102 is locked, thereby completing the maintenance operation.

According to the cover opening-and-closing support mechanism of the automatic transaction machine of the second exemplary embodiment, a space is provided for the rod section of the gas spring to enter into, and configuration is made with the stopper portions facing each other on either side of the space, such that the range of the stopper portion for contacting the cylinder section is widened. Consequently, the cover opening-and-closing support mechanism of the second exemplary embodiment, in addition to the advantageous effects of the first exemplary embodiment, is also capable of locking the gas spring even more reliably, and is capable of reliably preventing contact between the stopper portions and the rod section even when there is some variation in the positional accuracy of the stopper portion and the limiter portion.

Other Exemplary Embodiments

In the explanation of the exemplary embodiments above, explanation has been given of cases in which a cover opening-and-closing support mechanism is provided at an opening-and-closing cover that opens and closes in the up-down direction. However, the cover opening-and-closing support mechanism of the present invention can be applied to a cover that opens and closes in a direction that is inclined in the up-down direction or a substantially horizontal direction.

For example, when the cover opening-and-closing support mechanism is applied to a cover that opens and closes in a horizontal direction, by attaching such that the release handle portion 2c side shown in FIG. 1 is at the bottom side, when the cover is opened in a horizontal direction and the gas spring 1 has been extended, the cylinder section 1c of the gas spring 1 makes contact with the stopper portion 2a or the stopper portions 12a due to the moment about gas spring pivot point 1b as the pivot point due to the weight of the gas spring stopper 2 or 12 itself, and a locked state can be achieved.

Furthermore, in the explanation above an example of a cover opening-and-closing support mechanism provided only to the right hand side of the automatic transaction device 100 has been explained, as shown in FIG. 5. However the present invention can be readily employed to cases in which provision is made to the left hand side and cases of provision to both the left and right hand sides.

INDUSTRIAL APPLICABILITY

As explained above, the present invention can be widely employed in automatic transaction machines provided with cover opening-and-closing support mechanisms that utilize gas springs, such as ATMs.

The invention claimed is:

1. A cover opening-and-closing support mechanism comprising:
   a gas spring having a first pivot point at a first end portion and a second pivot point at a second end portion, the gas spring including a cylinder section and a rod section;
   a gas spring stopper including a limiter portion that contacts one side of the cylinder section, and including a stopper portion that contacts a top side of the cylinder section; and
   a release handle portion that unlocks the gas spring, the release handle portion disposed at the gas spring stopper on substantially an opposite side of the stopper portion, such that the gas spring stopper swings towards substantially the opposite side of the stopper portion based on a weight of the release handle portion;
   wherein the limiter portion is disposed at a predetermined distance away from the stopper portion in a direction away from the cylinder section;
   wherein the stopper portion and the limiter portion are disposed at the gas spring stopper at an opposite side of the release handle portion; and
   wherein the stopper portion locks the gas spring when the gas spring has been extended and the stopper portion contacts a bottom side of the cylinder section, and the limiter portion limits movement of the stopper portion by contacting a side surface of the cylinder section such that the stopper portion does not contact the rod section of the gas spring when the gas spring is locked.

2. The cover opening-and-closing support mechanism of claim 1, wherein two of the stopper portions are disposed to face each other on either side of a space into which the rod section of the gas spring is inserted.

3. An automatic transaction machine provided with the cover opening-and-closing support mechanism of claim 1.

4. An automatic transaction machine provided with the cover opening-and-closing support mechanism of claim 2.

* * * * *